United States Patent
Bai et al.

(10) Patent No.: US 9,569,866 B2
(45) Date of Patent: Feb. 14, 2017

(54) FLEXIBLE VIDEO OBJECT BOUNDARY TRACKING

(71) Applicant: Adobe Systems Incorporated, San Jose, CA (US)

(72) Inventors: Xue Bai, Seattle, WA (US); Jue Wang, Kenmore, WA (US); Yao Lu, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 52 days.

(21) Appl. No.: 14/643,630

(22) Filed: Mar. 10, 2015

(65) Prior Publication Data

US 2016/0267690 A1    Sep. 15, 2016

(51) Int. Cl.
| | |
|---|---|
| *G06T 11/20* | (2006.01) |
| *G06T 7/00* | (2006.01) |
| *G06T 15/10* | (2011.01) |
| *G06T 15/00* | (2011.01) |
| *G06T 7/60* | (2006.01) |
| *G06T 11/00* | (2006.01) |

(52) U.S. Cl.
CPC .......... *G06T 11/203* (2013.01); *G06T 7/0083* (2013.01); *G06T 7/0089* (2013.01); *G06T 7/60* (2013.01); *G06T 11/001* (2013.01); *G06T 15/005* (2013.01); *G06T 15/10* (2013.01); *G06T 2200/04* (2013.01); *G06T 2207/10024* (2013.01); *G06T 2207/20192* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 2004/0131249 A1* | 7/2004 | Sandrew | G06T 7/0036 382/162 |
| 2014/0003719 A1* | 1/2014 | Bai | G06T 7/2066 382/173 |

OTHER PUBLICATIONS

Bai, X., Wang, J., Simons, D., and Sapiro, G. 2009. Video snapcut: robust video object cutout using localized classifiers. ACM Trans. Graph. 28 (July), 70:1-70:11.*
Li, Y., Sun, J., Tang, C.-K., and Shum, H.-Y. 2004. Lazy snapping. In Proc. of ACM SIGGRAPH, 303-308.*

* cited by examiner

*Primary Examiner* — Utpal Shah
*Assistant Examiner* — Kate R Duffy
(74) *Attorney, Agent, or Firm* — Wolfe-SBMC (57) ABSTRACT

Techniques involving flexible video object boundary tracking are described. One or more curves, such as Bezier curves, are received as drawn by a user on an initial frame of video to define a boundary of an object in the frame. The curves are then mapped to a subsequent or previous frame of the video where the object is included but has a new or changed boundary. A segmentation boundary is determined for the object in the subsequent frame and endpoints of segments of the curves are snapped to the segmentation boundary. Additionally, confidence values are determined for subregions of the frame that include portions of the curves. These confidence values are used to update control points on the curve segments to fit the curve segments to the new or changed boundary of the object in the frame.

20 Claims, 9 Drawing Sheets

FLEXIBLE VIDEO OBJECT BOUNDARY TRACKING

BACKGROUND

Conventional user-assisted video object selection and segmentation techniques can be divided into two general categories: curve-based and brush-based methods. In curve-based methods, an object boundary is generally represented by a set of smooth curves, such as Bezier curves. A user interface is typically provided to allow a user to precisely place and adjust control points of these curves along the object boundary for accurate selection of the object. Simple interpolation is then applied between two non-adjacent key frames to produce segmentation on intermediate frames. This process is generally known as "Rotoscoping". Such methods can provide fine control on the selection, and generate high-quality smooth curves with both spatial and temporal stability across frames. However, such methods require the user to manually align the curves on numerous key frames, causing this process to be very time-consuming and labor-intensive.

The brush-based methods generally require the user to paint brush strokes in the interior of the desired object, and negative strokes outside of the object. A segmentation algorithm then calculates an optimal segmentation outline, also referred to herein as a mask, using the brush strokes as hard constraints. The mask is updated progressively to achieve the desired segmentation as the user continues to add more brush strokes. Compared with curve-based methods, this approach requires less amount of user brush strokes, which are not required to be precisely placed, thus significantly simplifying the workflow and shortening the work time. However, these brush-based methods generally produce relatively low quality, non-parameterized boundary curves that are not easily controllable by the user. Moreover, although the brush-based methods account for temporal coherence, their results are inferior in terms of temporal stability, generally containing visually distracting boundary chattering and causing the results to be unusable in video production. Because the users do not have precise control on the resulting curves, it is challenging to correct small errors on the boundaries to further improve the results.

SUMMARY

Techniques for flexible video object boundary tracking are described. For example, a user may draw Bezier curves on an initial key frame of video data to define a contour or boundary of an object in the frame. Then without further user interaction, the curves can be automatically propagated frame-by-frame throughout the video data. Using the techniques described herein, the curves can be propagated forward and/or backward throughout the video data based on the user-drawn curves on the initial frame. In contrast to conventional techniques, the user is not required to create an end boundary by drawing additional curves on an additional key frame to interpolate curves between the initial frame and the end boundary. Instead, the curves from the single initial frame are updated frame-by-frame based on a confidence value described below that is used to determine which of a plurality of different techniques to use to estimate the curves on a next or previous frame to fit a new or changed boundary of the object in the next frame or previous frame.

In one or more implementations, endpoints of a curve segment are snapped to a segmented boundary in the next frame. Then, control points on the curve segment are updated to fit the new or changed boundary based on a confidence value associated with respective control points. A confidence value indicates a measure of separability between foreground and background colors on opposing sides of the boundary, and if the confidence value is below a threshold value, then each control point is updated based on movement of one or more feature points in a subregion of the image that includes the control point. If, however, the confidence value exceeds the threshold value, then each control point is updated using a fitting algorithm that is weighted based on the confidence value. Accordingly, the techniques described herein propagate curves from an initial frame to additional frames to track non-rigid, non-uniform object motion without user interaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional video object selection techniques, such as curve-based techniques, are labor-intensive and time-consuming to accurately track the boundary of an object that moves from frame to frame in a video. Other conventional techniques that are less labor-intensive, such as brush-based techniques, otherwise result in low quality non-parameterized boundary curves that are unusable in video production.

Techniques involving flexible video object boundary tracking are described. In the following discussion, a variety of different implementations are described that involve flexible boundary tracking of objects in a video, such as between frames of the video. In one example, one or more curves, such as Bezier curves, drawn by a user on an initial frame of video to define a boundary of an object in the frame are received. The curves are then mapped to a next frame of the video where the object is included but has a different, new or changed boundary. In implementations, a segmentation boundary is determined for the object in the next frame and endpoints of segments of the curves are snapped to the segmentation boundary. Additionally, confidence values are determined for subregions of the next frame that include portions of the curves. The confidence values indicate a measure of separability between foreground and background colors in a subregion of the frame. These confidence values are used to update control points on the curve segments to fit the curve segments to the new or changed boundary of the object in the next frame.

Accordingly, an object in a video can be easily tracked frame-by-frame without additional user interaction. Additionally, the object can be tracked forward and/or backward through the video frames. Also, at least some of the curves or curve segments are updated differently based on the confidence values. Consequently, based on the confidence value, one curve segment can be updated using a fitting algorithm for the control points of the curve segment, while another curve segment can be updated using movement calculations of features that are proximate to the control points of the other curve segment. Accordingly, the techniques describes herein adaptively propagate the curves to the next or previous video frames based on the confidence values.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

As employed herein, the term "video data," also referred to herein as "video content," is representative of data, such as a sequence of key frames that can be played back to produce moving visual images. Additionally, the video data can include one or more objects. In implementations, the video data can be displayed for a user and played back at varying speeds.

As employed herein, the term "object" (also referred to herein as "video object") is representative of a material article that is depicted in an image, such as in a key frame of video data. The object can include an item, device, gadget, entity, person, and so on. Thus, the term "object" can represent any of a variety of objects in video data. Further examples of the above-described terms may be found in relation to the following discussion.

Example Environment

Figure 1:
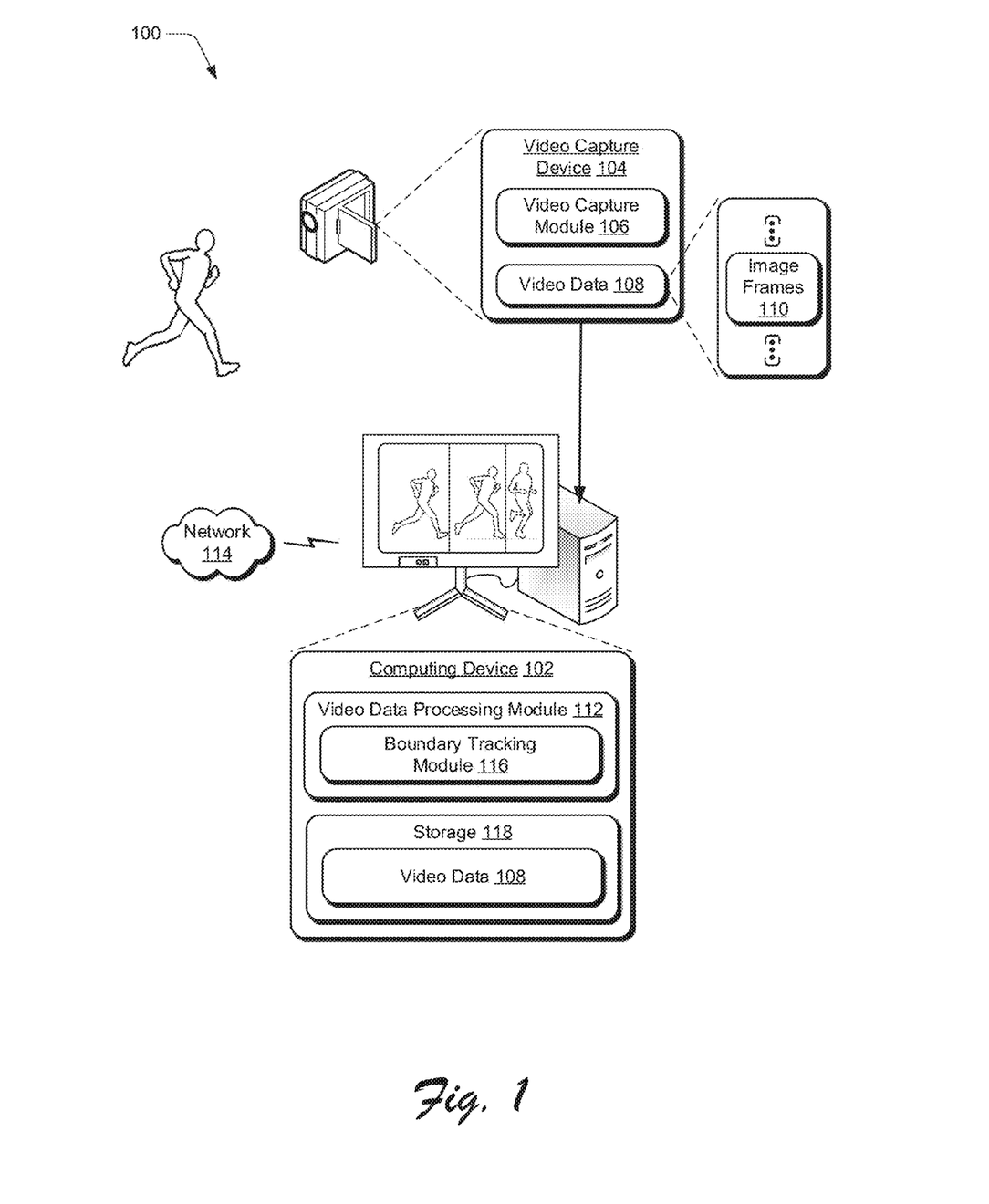
FIG. 1 is an illustration of an environment in an example implementation that is operable to employ techniques for flexible video object boundary tracking.

FIG. 1 is an illustration of an environment 100 in an example implementation that is operable to employ techniques described herein. The illustrated environment 100 includes a computing device 102 and a video capture device 104, both of which may be configured in a variety of ways.

The computing device 102, for instance, may be configured as a desktop computer, a laptop computer, a mobile device (e.g., assuming a handheld configuration such as a tablet or mobile phone), and so forth. Additionally, although a single computing device 102 is shown, the computing device 102 may be representative of a plurality of different devices, such as multiple servers utilized by a business to perform operations "over the cloud" as further described in relation to FIG. 9.

The video capture device 104 may also be configured in a variety of ways. The illustrated example includes a stand-alone video camera as a dedicated device. Other examples are also contemplated for the video camera, such as part of a mobile phone or tablet and thus the video camera may be incorporated as part of the computing device 102 itself. The video capture device 104 is illustrated as including a video capture module 106, which is representative of functionality to capture digital video data 108 that is a sequence of image frames 110. The video capture module 106 can be implemented with image sensors, as well as other hardware and software components to capture, process, and/or store digital video data 108. The digital video data 108 can be displayed on any type of display device that is connected to, or integrated with, the computing device 102. The image frames 110 of the video data 108 are also referred to herein as input image frames, such as any type of digital image that is an input to the computing device or to a computing system for any type of digital and/or image processing.

The computing device 102 is illustrated as including a video data processing module 112, which can be implemented as a software application, such as executable software instructions (e.g., computer-executable instructions) that are executable by a processing system of the computing device 102 and stored on a computer-readable storage memory of the device. The computing device can be implemented with various components, such as a processing system and memory, and with any number and combination of differing components as further described with reference to the example device shown in FIG. 9.

The video data processing module 112 is representative of functionality to perform one or more techniques that are usable to process digital video data. Although illustrated as implemented locally on the computing device 102, functionality of the video data processing module 112 may also be implemented in a distributed environment, remotely via a network 114 (e.g., "over the cloud") as further described in relation to FIG. 9, and so on. In at least some examples, the video data processing module 112 can be implemented via a mobile application, a desktop application, a plugin, a hosted service, a combination of client and server, or any combination thereof.

An example of video data processing that can be performed by the video data processing module 112 is represented as a boundary tracking module 116. The boundary tracking module 116 is representative of functionality to determine curves drawn on a selected key frame of video content to define a boundary of an object in the selected key frame, and propagate those curves to a subsequent or previous key frame of the video content in such a way as to automatically align the curves with a new or changed boundary of the object in the second key frame. Further, the boundary tracking module 116 is configured to map the curves without interpolation of the curves between the key frames.

The video data 108 can be maintained in the storage 118, which may be a component of the computing device 102, may be remote from the computing device 102, or may be a third-party database. The storage 102 may be a single database, or may be multiple databases, at least some of which include distributed data. Thus, a variety of different types of storage mechanisms can be utilized for the storage 118.

Example Implementation

The following discussion describes example implementations of flexible video object boundary tracking that can be employed to perform various aspects of techniques discussed herein. The example implementations may be employed in the environment 100 of FIG. 1, the system 900 of FIG. 9, and/or any other suitable environment.

Figure 2:
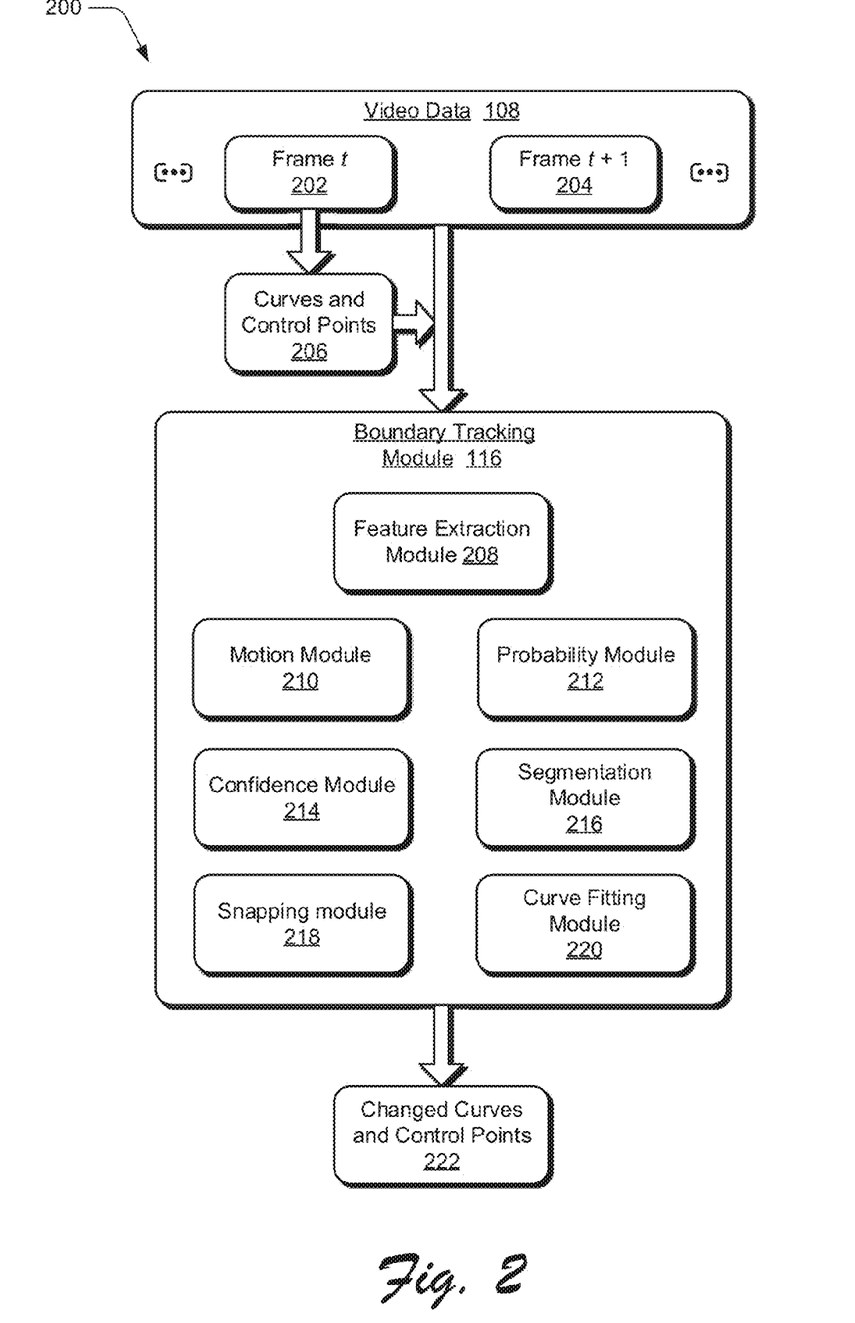
FIG. 2 is an illustration of an example implementation that is operable to employ techniques for flexible video object boundary tracking.

FIG. 2 is an illustration of an example implementation 200 that is operable to employ techniques for flexible video object boundary tracking. The illustrated implementation 200 includes video data 108 with frame t 202 and frame t+1 204. In implementations, frame t+1 204 can be subsequent to or previous to the frame t 202 in the video data 108.

In the illustrated example, curves and control points 206 are determined from one or more curves drawn on frame t 202, further discussion of which is provided below in more detail and illustrated in FIGS. 3-7. The curves drawn on frame t 202 define a boundary or contour of an object in frame t 202. In implementations, the boundary of the object is a closed boundary that encompasses the object and from which a mask can be generated. As described above, a mask is a technique used to selectively obscure or hold back parts of an image while allowing other parts of the image to show. As described herein, the mask can be formed from the curves that define the boundary of the object in the image.

The boundary tracking module 116 is illustrated as including a feature extraction module 208, a motion module 210, a probability module 212, a confidence module 214, a segmentation module 216, a snapping module 218, and a curve fitting module 220. These modules can be used by the boundary tracking module 116 of the computing device 102 to propagate the curves drawn on frame t 202 to frame t+1 204 to define a changed boundary of the object in frame t+1 204 based on changed curves and control points 222. Further discussion of the various modules and other aspects are provided in further detail below.

Figure 3:
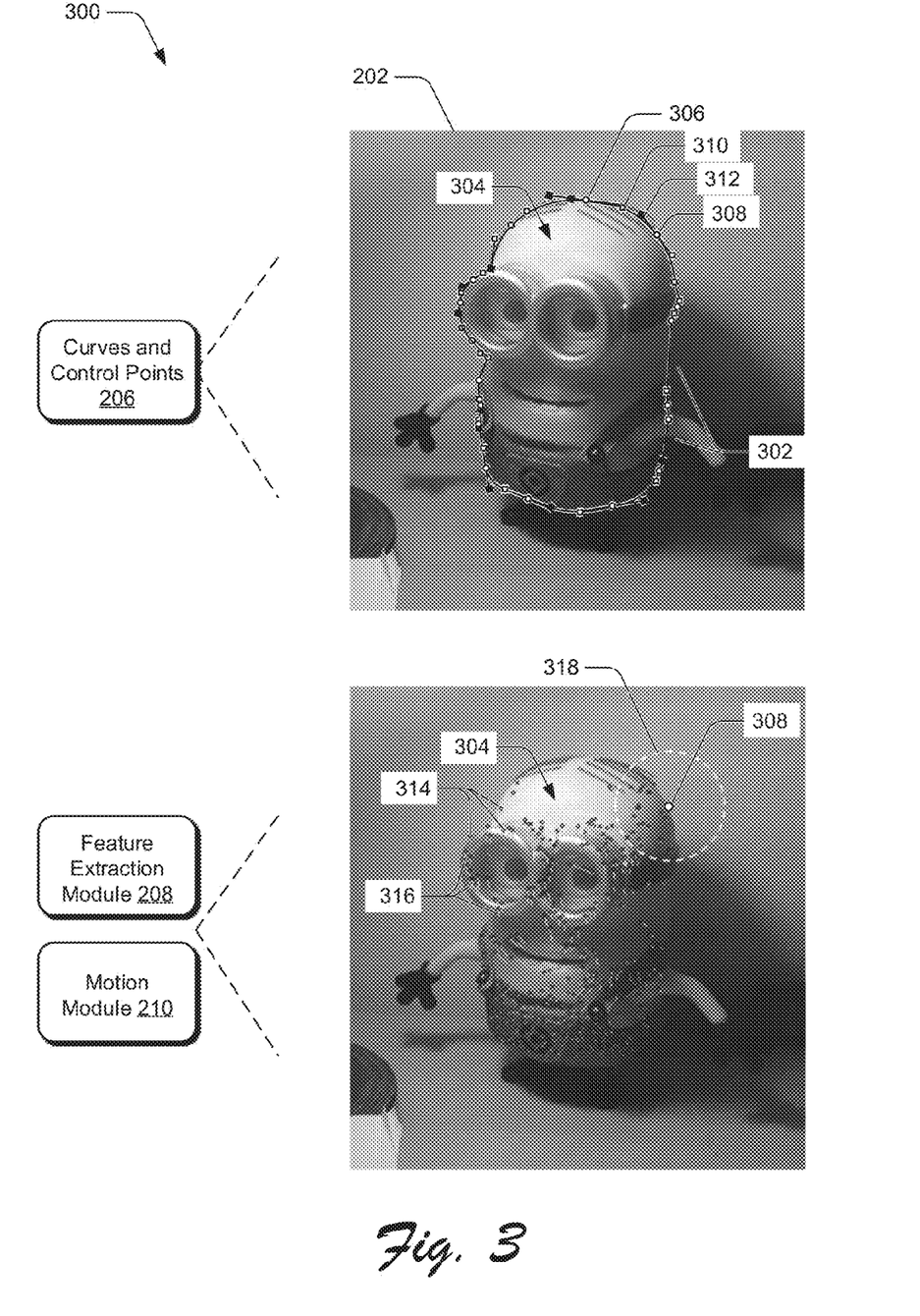
FIG. 3 is an illustration of an example implementation of functionalities represented by the boundary tracking module.

FIG. 3 illustrates an example implementation 300 of functionalities represented by the boundary tracking module 116. An initial frame, such as frame t 202, is illustrated with a closed contour 302 formed by a series of curves, such as Bezier curves, drawn by a user in association with frame t 202. In implementations, the closed contour 302 can be associated with an object 304 in the frame t 202. In the illustrated example, the closed contour 302 includes N cubic Bezier curve segments, where each i-segment is uniquely defined by four points $\{P_1^i, P_2^i, P_3^i, P_4^i\}$, i=1 ... N. Here, points $P_1^i$ and $P_4^i$ represent curve endpoints 306 and 308, respectively, located on the object boundary. In addition, points $P_2^i$ and $P_3^i$ represent control points 310 and 312, respectively, (also referred to as handles) that determine tangents of the curve segment $P_1^i P_4^i$. Note that the endpoint $P_4^i = P_1^{i+1}$ such that adjacent curve segments share a common endpoint. By standard Bezier curve representation, a curve B for segment i connecting two end points is:

$$B^i(t) = (1-t)^3 P_1^i + 3(1-t)^2 t P_2^i + 3(1-t)t^2 P_3^i + t^3 P_4^i, \ t \in [0,1].$$

In implementations, the feature extraction module 208 is configured to detect sparse feature points 314 inside a mask enclosed the closed contour 302 that is formed by the curves. These feature points 314 can be detected using any of a variety of feature tracking techniques, such as described by "Good Features To Track" by Shi and C. Tomasi (IEEE Conference on Computer Vision and Pattern Recognition, pages 593-600, June 1994). Accordingly, feature points, such as feature points 314 are extracted from both frame t 202 and frame t+1 204.

In at least some implementations, the motion module 210 is configured to determine movement for each feature point 314 from frame t 202 to frame t+1 204. This provides sparse optical flow vectors between the two frames, frame t 202 and frame t+1 204. In addition, a correspondence between corresponding feature points 314 in each frame is calculated, which determines movement for each feature point 314 from frame t 202 to frame t+1 204. In implementations, the movement for each feature point 314 is represented by an optical flow vector associated with the feature point 314. In the illustrated example, feature points 314 are shown as dots while associated optical flow vectors 316 are represented by lines connected to the dots. In at least some implementations, movement $\overline{v}_\iota$ of each endpoint is calculated as a weighted local average of the optical flow vectors of feature points 314 within a neighborhood $\Omega$ 318 that has a range radius r and which is centered at $P_1^i$. For example, the movement $\overline{v}_\iota$ can be calculated based on:

$$\overline{v}_\iota = \frac{\sum v_k w_k}{\sum w_k}, \ v_k \in \Omega$$

where $w_k = 1/(d_k + \epsilon)$ and $d_k$ is the geodesic distance from $P_1^i$ to the feature point 314. Accordingly, the term $w_k$ represents to a weight defined by the inverse of the geodesic distance. In some implementations, the neighborhood $\Omega$ 318 might only include a few feature points 314 or even zero feature points 314. In this case, the range radius r of the neighborhood $\Omega$ 318 is increased until a threshold number of feature points are included in the neighborhood $\Omega$ 318. A predicted endpoint $P_1^{i\prime}$ is determined based on:

$$P_1^{i\prime} = P_1^i + \overline{v_1}.$$

Accordingly, the movement $\overline{v}_\iota$, also referred to herein as a motion vector, for each control point is used to predict the new position of the control point in the new frame, such as frame t+1.

Figure 4:
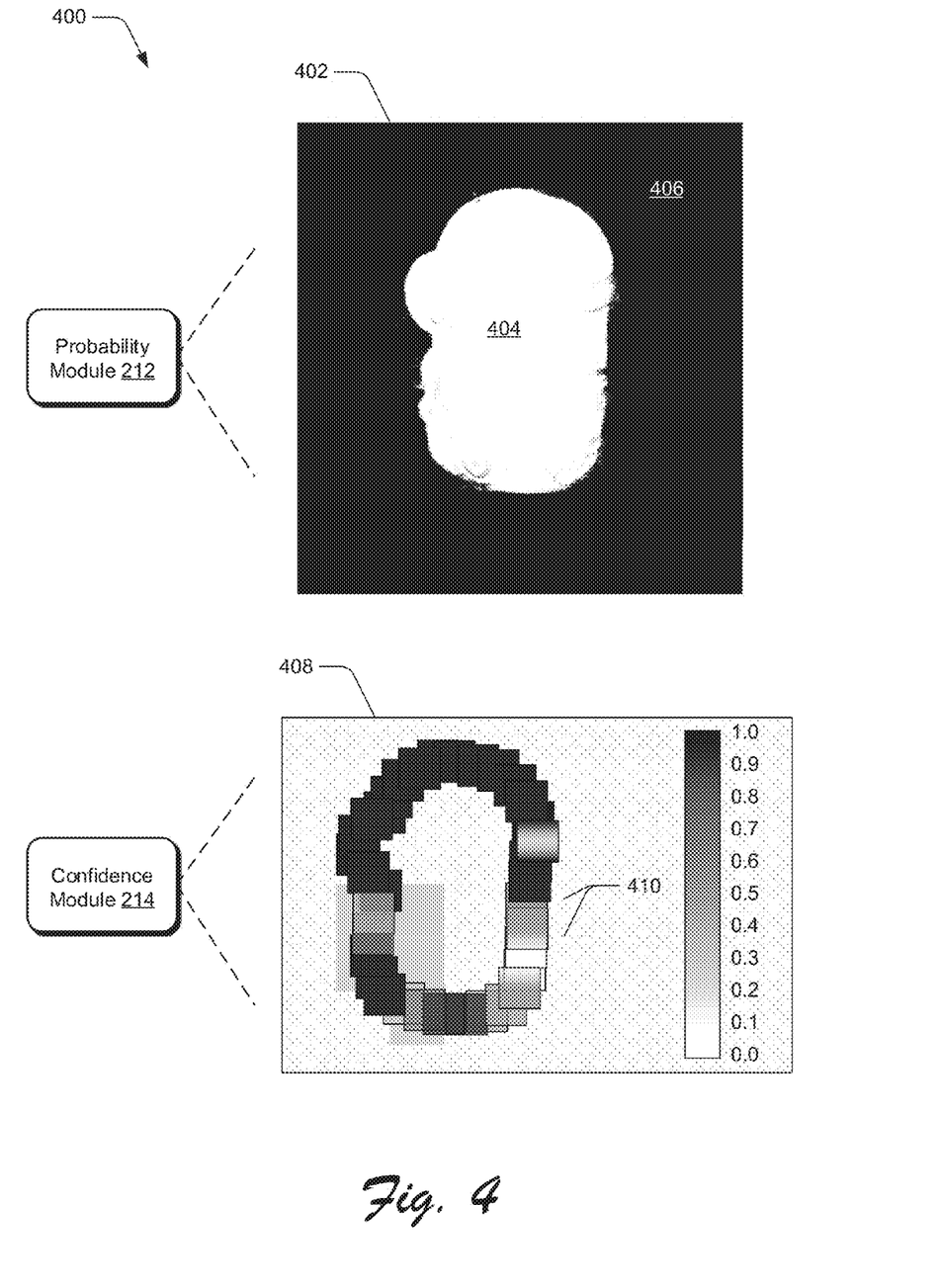
FIG. 4 is an illustration of an example implementation of functionalities represented by the boundary tracking module.

FIG. 4 illustrates an example implementation 400 of functionalities represented by the boundary tracking module 116. In particular, the boundary tracking module 116 includes a probability module 212 that is configured to generate a probability map 402 of frame t+1 204. Any suitable algorithm can be used to generate a probability map. For instance, techniques such as a Rotobrush tool in After Effects® by Adobe® Systems, Inc. can be used to generate the probability map of the new frame. In the illustrated example, the probability map 402 of the object 304 on frame t+1 204 includes a white area 404 that represents a high probability of being an object, and a dark area 406 that represents a background (e.g., low probability of being an object).

In addition, the confidence module 214 can generate a confidence map 408 for frame t+1 204. The confidence map 408 represents a smooth blend of local confidence values $f_c$ for local regions along the boundary of the object 304. The confidence value $f_c$ refers to a measure of separability between foreground and background colors in local regions (also referred to herein as subregions) of the frame. In implementations, the separability represents a relative level of contrast between pixel colors inside the mask and proximate pixels that are outside the mask. Accordingly, any suitable method can be used to generate the confidence map.

In the illustrated example, each local region 410 in the confidence map 408 is represented by a square that corresponds to an average level of confidence for that local region 410. For example, local regions 410 along the top of the object 304 have a high confidence value, which indicates that the foreground and background colors have a high measure of separability. In contrast, the lower right area of the object 304 includes lightly shaded squares that represent a low confidence value, which indicates a color ambiguity on both sides of the edge of the object 304 (e.g., low measure of separability). These confidence values can be used to estimate new or changed curves for frame t+1 204. Further, each boundary point on the object boundary can be assigned a scalar value according to the confidence map.

Figure 5:
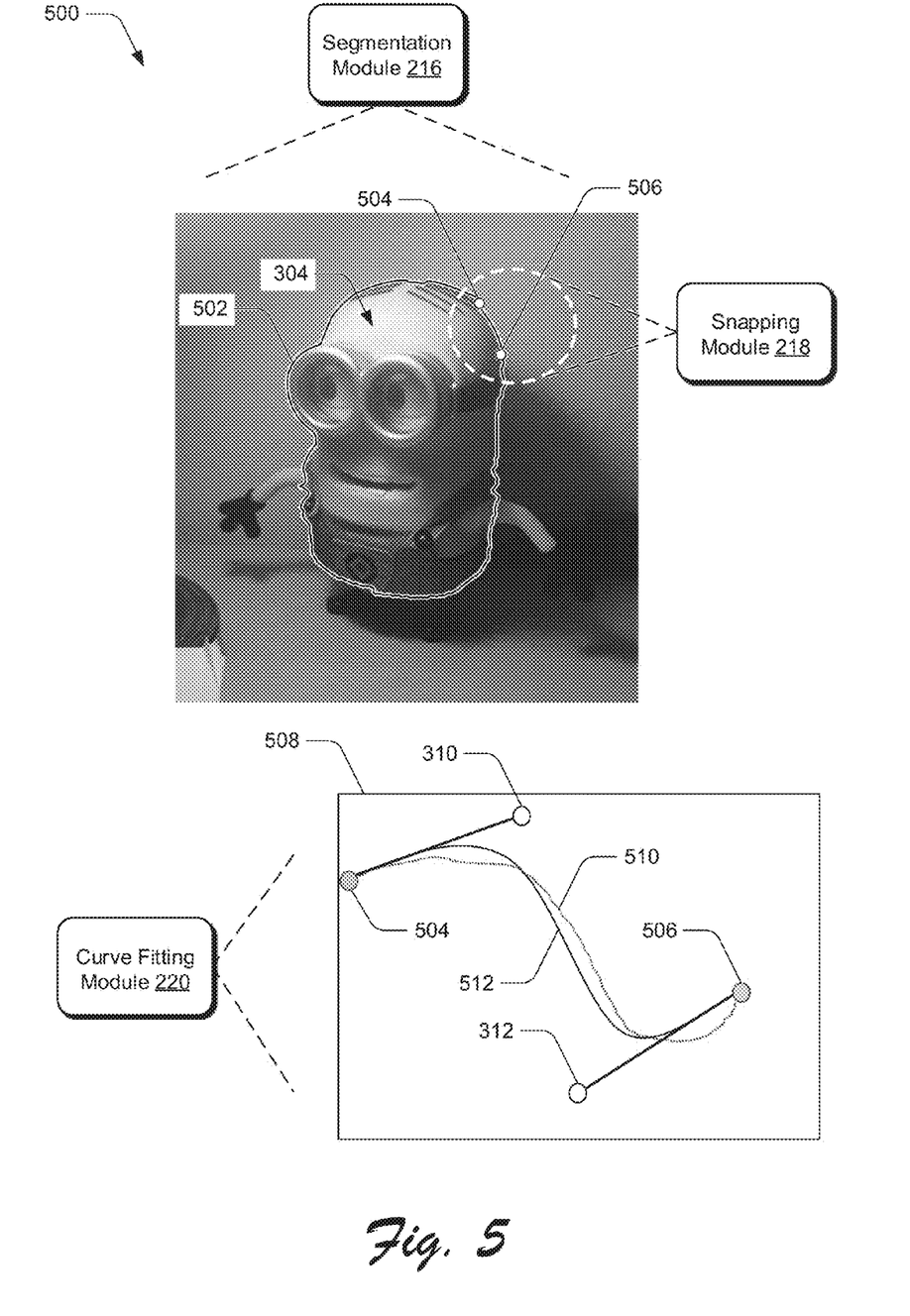
FIG. 5 is an illustration of an example implementation of functionalities represented by the boundary tracking module.

FIG. 5 is an illustration of an example implementation 500 of functionalities associated with the boundary tracking module 116. In particular, the segmentation module 216 is configured to separate the foreground objects from the background of the new frame. To do this, the segmentation module 216 is configured to utilize data obtained from the probability map 402. Any suitable technique can be used to generate a probability map, such as After Effects®, which uses a weighted combination of a segmentation shape prediction and a segmentation color model to segment a current image.

In implementations, the segmentation module 216 generates a curve that is a rough prediction of the changed boundary 502 of the object 304 in the new frame. Then, using the snapping module 218, the predicted endpoints $P_1^{i\prime\prime}$ and $P_4^{i\prime\prime}$ are snapped, or otherwise projected, onto the changed boundary 502 of the object 304. By snapping the endpoints $P_1^{i\prime\prime}$ and $P_4^{i\prime\prime}$ onto the changed boundary 502, the predicted endpoints $P_1^{i\prime\prime}$ and $P_4^{i\prime\prime}$ are given new locations $P_1^{i\prime\prime\prime}$ and $P_4^{i\prime\prime\prime}$, which correspond to locations 504 and 506, respectively. In addition, the changed boundary 502 is divided into N segments. In at least one example, the curve along the changed boundary 502 is predicted using an image processing algorithm such as Graph Cut, which finds a globally optimal segmentation solution.

FIG. 5 also illustrates functionalities associated with the curve fitting module 220, which is configured to determine an optimal Bezier curve for the changed boundary 502 of the object 304 in frame t+1 204 based on the new locations 504 and 506 of the snapped predicted endpoints $P_1^{i\prime\prime\prime}$ and $P_4^{i\prime\prime\prime}$. In the illustrated example, a graph 508 represents the snapped predicted endpoints $P_1^{i\prime\prime\prime}$ and $P_4^{i\prime\prime\prime}$ (e.g., shaded circles) that are shown as having been snapped to the new locations 504 and 506 on the segmented boundary 510 of the object 304 in the new frame. The segmented boundary 510 is represented by a dotted line, which is a series of points from the raw segmentation of frame t+1 204. Each point on the segmented boundary 510 can be defined by $\{t_k, C_k, \omega_k\}$, where the term $C_k$ refers to a location of the current point, the term $\omega_k$ refers to the confidence value associated with the current point, and the term $t_k$ refers to a time parameter in relation to the curve. In implementations, the term $t_k$ refers to a curve length ratio between $\overline{P_1 C_k}$ and $\overline{P_1 P_4}$, where $t_k \in [0, 1]$. For example, assume a curve segment has 100 points, where a first point at one end of the curve segment has a t value of zero, a last point at the other end of the curve segment has a t value of one, and the remaining points in between range from zero to one. The term $t_k$ is then defined, for each respective point $C_k$ on the curve segment $P_1$ to $P_4$, by length $\overline{P_1 C_k}$ (e.g., distance from $P_1$ to point $C_k$) divided by the total length of the curve $\overline{P_1 P_4}$ (e.g., distance from $P_1$ to $P_4$).

In implementations, the curve fitting module 220 is configured to estimate a new or changed curve 512 to fit as closely as possible to the segmented boundary 510. Accordingly, the curve fitting module 220 is configured to adjust the locations of the control points 310 and 312 to align the new or changed curve 512 with the segmented boundary 510. By adapting the Bezier curve equation defined above, the new or changed curve 512 can be fitted based on:

$$C_k = (1-t_k)^3 P_1^i + 3(1-t_k)^2 t_k P_2^i + 3(1-t_k) t_k^2 P_3^i + t_k^3 P_4^i, \ k=1 \ldots K.$$

Next, the x and y coordinates are separated. Separating the x coordinates results in:

$$x_k^c = (1-t_k)^3 x_1^i + 3(1-t_k)^2 t_k x_2^i + 3(1-t_k) t_k^2 x_3^i + t_k^3 x_4^i, \ k=1 \ldots K.$$

Next, the confidence value is added as weight to each equation, providing emphasis on one or more points that have higher confidence. Consequently, a total fitting error is calculated based on:

$$E^i = \sum_k \omega_k (x_k^c) \cdot [(1-t_k)^3 x_1^i + 3(1-t_k)^2 t_k x_2^i + 3(1-t_k) t_k^2 x_3^i + t_k^3 x_4^i - x_k^c]^2$$

Using a weighted least square error regression, $x_2^i$ and $x_3^i$ can be solved by minimizing $E^i$ with respect to $x_2^i$ and $x_3^i$. Similar derivation for separating y coordinates can be used to solve for $y_2^i$ and $y_3^i$, which when combined with $x_2^i$ and $x_3^i$, provide optimal locations for $P_2^i$ and $P_3^i$ for this curve segment. Similar calculations can be used to determine Bezier curves for each curve segment of the mask.

Figure 6:
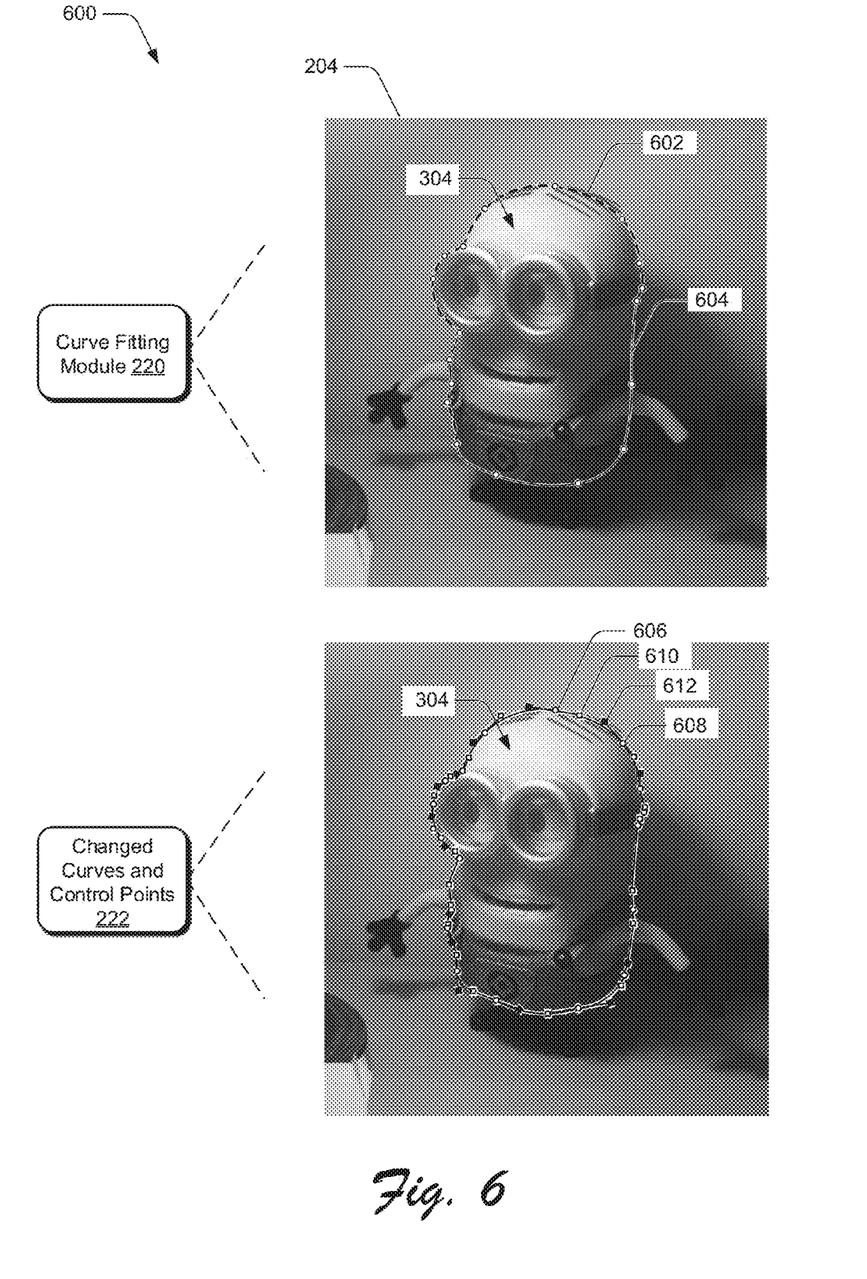
FIG. 6 is an illustration of an example implementation of example results that are output using the techniques described herein.

FIG. 6 is an illustration of an example implementation 600 of example results that are output using the techniques described herein. For example, the curve fitting module 218 is configured to fit one or more new curves to the object in the frame t+1 204. In at least some implementations, the confidence values associated with the endpoints of a curve segment can be below a threshold value, which indicates that the segmentation for that curve segment is unreliable. In this example, the curve fitting equations described above are skipped and each control point of the curve segment is instead moved based on associated local motion of the control point. In the illustrated example, curve 602 represented by a dashed line is generated using the fitting process described above based on relatively high confidence values. In contrast, with respect to curve 604 represented by a solid line, the fitting process was skipped based on relatively low confidence values and the control points for each curve segment of curve 604 were determined based on local motion techniques described above.

Once the curves are fitted to the new or changed boundary in the new frame t+1 204, the boundary tracking module 116 can output changed curves and control points 222, as illustrated in FIG. 6. For example, endpoints 606 and 608 represent predicted endpoints $P_1^{i\prime\prime\prime}$ and $P_4^{i\prime\prime\prime}$ on frame t+1 204, and control points 610 and 612 represent predicted control points $P_2^{i\prime\prime\prime}$ and $P_3^{i\prime\prime\prime}$ that determine the tangents of the curve segment $P_1^{i\prime\prime\prime}$ $P_4^{i\prime\prime\prime}$. Using the above-described techniques, each curve segment is estimated differently depending on the associated confidence value. For example, more flexibility is given for relatively high confidence subregions while relatively low confidence subregions are calculated more conservatively. Thus, the techniques described herein perform adaptive snapping based on confidence and movement of control points of a Bezier curve to a changed boundary of an object in a new frame. New or changed curves are thus generated on the new frame, and the process is repeated to automatically propagate the curves to additional frames without additional user interaction, whether the additional frames are subsequent to or prior to the initial frame in the sequence of image frames.

Example Procedures

The following discussion describes techniques for Flexible video object boundary tracking that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 7:
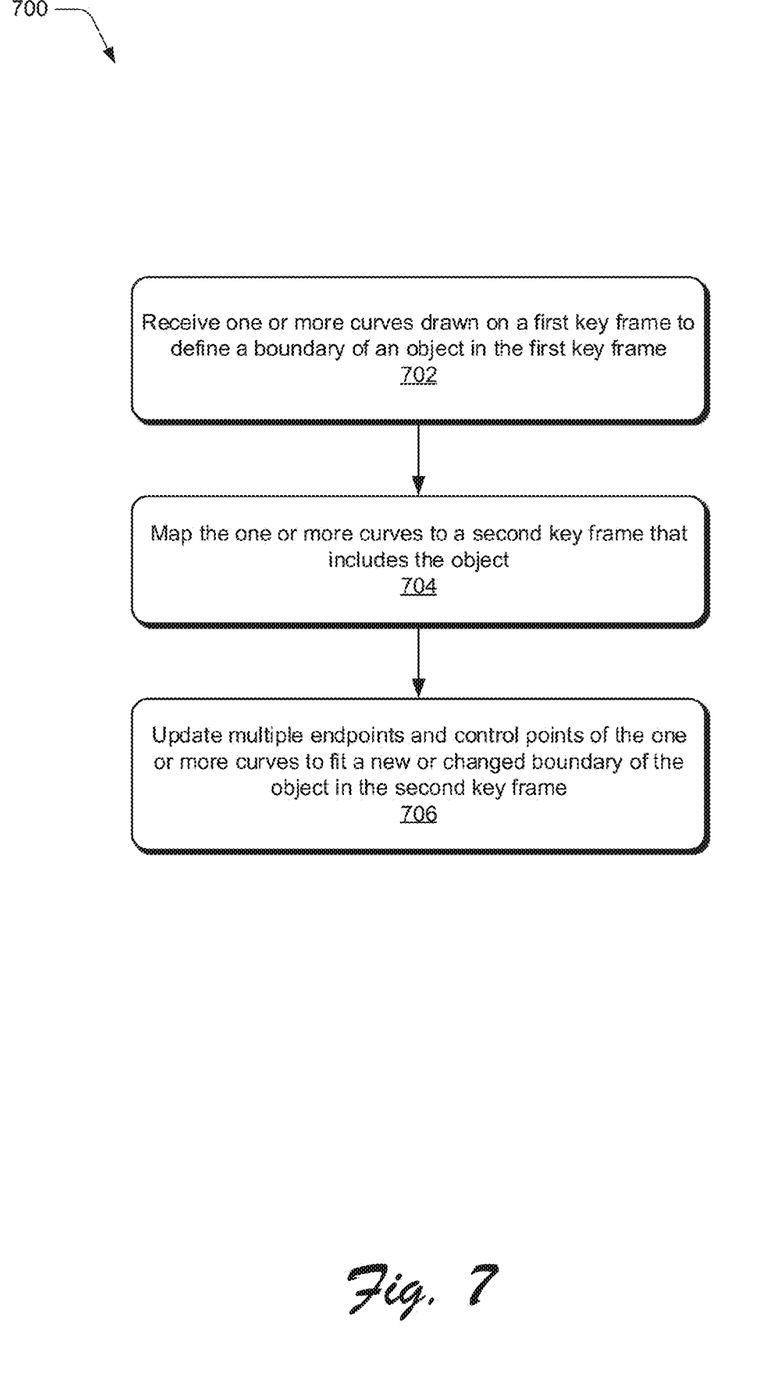
FIG. 7 is a flow diagram depicting a procedure in an example implementation in which techniques for flexible video object boundary tracking are employed.

FIG. 7 is a flow diagram depicting a procedure 700 in an example implementation in which techniques for flexible video object boundary tracking are employed. One or more curves drawn on a first key frame are received to define a boundary of an object in the first key frame (block 702). For example, a user can draw one or more Bezier curves on an initial frame of video data using any of a variety of curve drawing techniques to define the boundary of the object in the initial frame. The curves drawn on the initial frame include multiple endpoints and control points, which are used to define the curves.

The one or more curves are mapped to a second key frame that includes the object (block 704). This step can be performed in any suitable way, examples of which are described above. For instance, feature points are extracted from both the first and second frames. In addition, movement of each endpoint is calculated between the first and second frames relative to one or more motion vectors associated with the feature points.

The multiple endpoints and control points of the one or more curves are updated to fit a new or changed boundary of the object in the second key frame (block 706). This step can be performed in any suitable way, examples of which are described above. For example, the updating of the endpoints and control points can be based on a confidence value associated with respective subregions that include an endpoint or control point. In implementations, local probabilities and binary segmentation are computed to determine a rough prediction of the new or changed boundary of the object in the second key frame. In addition, a confidence map is generated based on confidence values associated with each feature point. In implementations, the endpoints are snapped to the new or changed boundary, creating fixed points. Additionally, new locations for the control points in the second key frame are estimated based on the confidence values.

Figure 8:
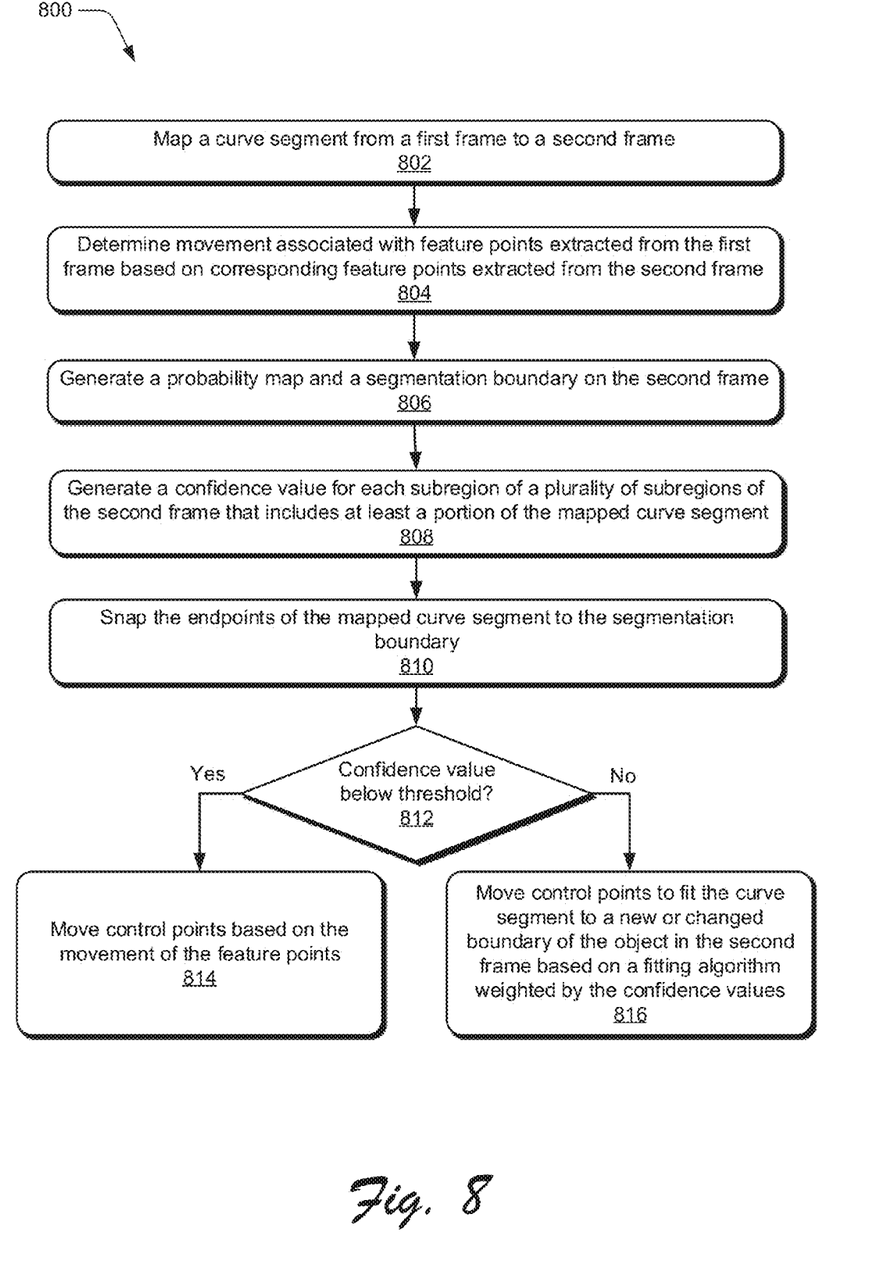
FIG. 8 is a flow diagram depicting a procedure in an example implementation in which techniques for flexible video object boundary tracking are employed.

Having discussed a general procedure with respect to FIG. 7, consider now a discussion of FIG. 8, which is a flow diagram depicting a procedure 800 in an example implementation in which techniques for flexible video object boundary tracking are employed. A curve segment is mapped from a first frame to a second frame (block 802). In one or more implementations, the curve segment is a Bezier curve, or a portion of a Bezier curve, drawn by a user on the first frame to define a boundary of an object in the first frame. In addition, feature points inside a mask enclosed by the curves can be detected in each frame using any of a variety of feature tracking techniques, examples of which are described above.

Movement associated with feature points extracted from the first frame is determined based on corresponding feature points extracted from the second frame (block 804). In one or more implementations, the movement for each feature point provides an associated flow vector that can be used to estimate new locations of endpoints and control points of the curve segment in the second frame, examples of which are described above.

A probability map and a segmentation boundary are generated on the second frame (block 806). This step can be performed in any suitable way, examples of which are described above. A confidence value is generated for each subregion of a plurality of subregions of the second frame that includes at least a portion of the mapped curve segment (block 808). In implementations, the probability map indicates a location on the frame that has a high probability of being an object in contrast to merely background. In addition, the confidence values indicate how separable foreground colors are from background colors. Further discussion of these features is provided above.

The endpoints of the mapped curve segment are snapped to the segmentation boundary (block 810). This step can be performed in any suitable way, examples of which are described above. In at least one implementation, snapping the endpoints to the segmentation boundary provides fixed points that are usable to estimate a new or changed curve to fit to the new or changed boundary.

A determination is made as to whether the confidence value for a respective endpoint is below a threshold (block 812). In implementations, a confidence value below the threshold indicates that the segmentation for a corresponding curve segment is unreliable because of ambiguity in color differences on opposing sides of the segmentation boundary (e.g., the edge of the object). If the confidence values for the endpoints of the mapped curve are below the threshold ("YES" at block 812), then the control points are moved based on the movement of the feature points (block 814). For example, the movement of features points within a subregion that includes a control point can be used to estimate a new location for the control point. In this way, the curve segment is re-estimated or transformed based on local image content.

If, however, a determination is made that the confidence values of the endpoints are not below the threshold ("NO" at block 812), then the control points are moved to fit a new or changed curve segment to the new or changed boundary of the object in the second frame based on a fitting algorithm weighted by the confidence values (block 816). For example, an optimal Bezier curve is determined by estimating the control points for the new or changed curve segment based on a curve length ratio, a location for respective points on the curve segment, and the confidence value associated with each point on the curve segment. Examples of these and other aspects are provided above.

Example System and Device

Figure 9:
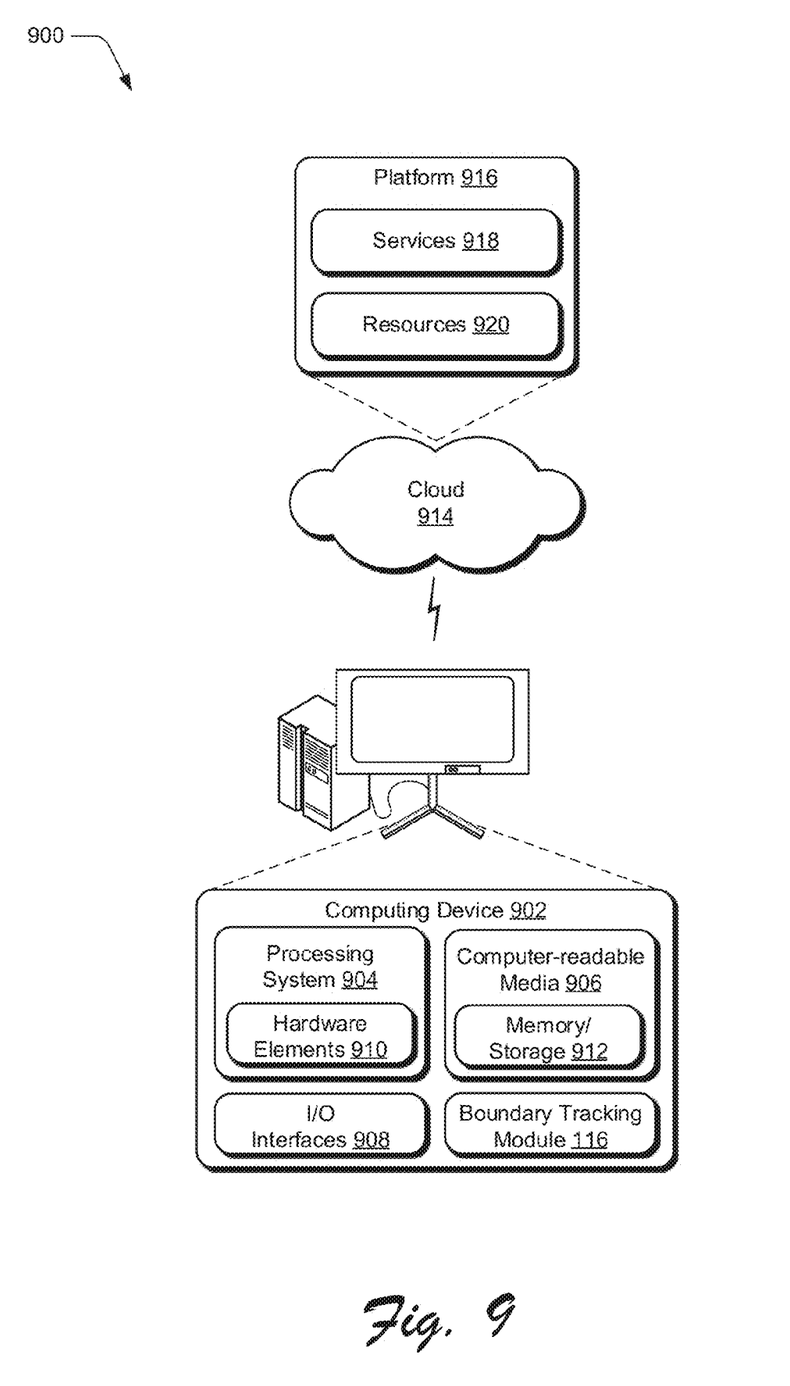
FIG. 9 illustrates various components of an example device that can be implemented as any type of computing device as described herein to implement the techniques described herein.

FIG. 9 illustrates an example system generally at 900 that includes an example computing device 902 that is representative of one or more computing systems and/or devices that may implement the various techniques described herein. This is illustrated through inclusion of boundary tracking module 116, which may be configured to track an object frame-by-frame in a sequence of frames of video data by propagating curves that define an object boundary in an initial frame to additional frames of the video data effective to define new or changed boundaries of the object in the additional frames. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

Cloud 914 includes and/or is representative of a platform 916 for resources 918. Platform 916 abstracts underlying functionality of hardware (e.g., servers) and software resources of the cloud 914. Resources 918 may include applications and/or data that can be utilized while computer processing is executed on servers that are remote from the computing device 902. Resources 918 can also include services 920 provided over the Internet and/or through a subscriber network, such as a cellular or Wi-Fi network.

Platform 916 may abstract resources and functions to connect computing device 902 with other computing devices. Platform 916 may also serve to abstract scaling of resources to provide a corresponding level of scale to encountered demand for resources 918 that are implemented via platform 916. Accordingly, in an interconnected device embodiment, implementation of functionality described herein may be distributed throughout system 900. For example, the functionality may be implemented in part on computing device 902 as well as via platform 916 that abstracts the functionality of cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method for propagating curves onto new key frames in a sequence of frames of video data, comprising:
   receiving one or more curves drawn on a first key frame to define a boundary of an object in the first key frame, the one or more curves including multiple endpoints and control points;
   mapping the one or more curves to a second key frame that includes the object, the mapping performed without interpolation of the one or more curves between the first key frame and an end boundary in the second key frame;
   generating a confidence value for respective subregions of a plurality of subregions of the second key frame that include at least a portion of the one or more curves that are mapped to the second key frame, the confidence value representing a measure of separability of foreground and background colors for each respective subregion;
   generating a confidence map of the confidence values to indicate a level of confidence for a predicted position of each control point in the second key frame, the confidence map including a blend of the confidence values of the respective subregions that are along a new or changed boundary of the object in the second key frame; and
   updating the multiple endpoints and control points of the one or more curves to fit the new or changed boundary of the object in the second key frame, the updating being based on the confidence map and the confidence value associated with the respective subregions that include one or more of the control points.

2. A computer-implemented method as recited in claim 1, further comprising detecting feature points inside a mask that is enclosed by the one or more curves on the first key frame.

3. A computer-implemented method as recited in claim 2, further comprising calculating movement of each control point between the first key frame and the second key frame relative to one or more motion vectors associated with the feature points.

4. A computer-implemented method as recited in claim 1, further comprising:
   snapping the multiple endpoints to the new or changed boundary of the object in the second key frame; and
   estimating a location of the control points in the second key frame to correspond to an optimal Bezier curve for the new or changed boundary of the object in the second key frame.

5. A computer-implemented method as recited in claim 1, further comprising
   determining whether the confidence value for a control point is below a threshold; and
   based on a determination that the confidence value for the control point is below the threshold, move the control point of the curve based on an optical flow vector associated with the control point between the first key frame and the second key frame.

6. A computer-implemented method as recited in claim 1, wherein the second key frame is previous to the first key frame in the sequence of frames of video data.

7. A system, comprising:
   one or more processors; and
   a memory having instructions that are executable by the one or more processors to implement a boundary tracking module that is configured to:
      map a curve segment from a first frame to a second frame, the curve segment corresponding to a boundary of an object in the first frame, the curve segment mapped without interpolation between the boundary in the first frame and an end boundary in the second frame;
      generate a confidence value for each subregion of a plurality of subregions of the second frame that includes at least a portion of the mapped curve segment, the confidence value representing a measure of separability of foreground and background colors for each local region;

generate a confidence map of the confidence values to indicate a level of confidence for a predicted position of control points of the mapped curve segment in the second key frame, the confidence map including a blend of the confidence values of the subregions that are along a new or changed boundary of the object in the second key frame;

snap endpoints of the mapped curve segment in the second frame to the new or changed boundary of the object in the second frame; and automatically fit the mapped curve segment to the new or changed boundary of the object in the second frame based on the confidence value for each local region in the confidence map.

8. A system as recited in claim 7, wherein the boundary tracking module is further configured to detect feature points inside a mask that is enclosed by a plurality of curves that include the curve segment.

9. A system as recited in claim 7, wherein the mapped curve segment is automatically fit to the new or changed boundary of the object in the second frame at least by:

in an event that the confidence value is below a threshold value, moving a respective control point of the mapped curve segment based on movement of feature points in a subregion that includes the respective control point; or in an event that the confidence value exceeds the threshold value, moving the respective control point of the mapped curve segment based on a fitting algorithm weighted by the confidence value for the subregion that includes the respective control point.

10. A system as recited in claim 7, wherein the mapped curve segment is automatically fit to the new or changed boundary of the object in the second frame based on an estimation of control points associated with the mapped curve segment.

11. A system as recited in claim 10, wherein the boundary tracking module is further configured to determine movement of a control point of the mapped curve segment based on a weighted average of flow vectors associated with feature points that are within an area centered at the control point.

12. A system as recited in claim 7, wherein the first frame is subsequent to the second frame in a sequence of frames of video data.

13. Computer-readable storage memory comprising stored instructions that are executable by a computing device to implement boundary tracking module configured to perform operations comprising:

identifying one or more curves drawn on a first frame of video data to define a boundary of an object in the first frame; and in response to identifying the one or more curves drawn on the first frame, automatically propagating the one or more curves onto additional frames of the video data to define a new or changed boundary of the object in each additional frame by at least:

mapping the one or more curves to the additional frames without interpolation of the one or more curves between the first frame and an end boundary in one of the additional frames;

determining confidence values associated with subregions of the additional frames that include at least a portion of the one or more curves, the confidence values representing a measure of separability of foreground and background colors in the subregions;

generating a confidence map for a respective additional frame to indicate a confidence level for a predicted position of each of a plurality of control points of the one or more curves in the respective additional frame, the confidence map representing a blend of the confidence values of the subregions that are along the new or changed boundary of the object in the respective additional frame;

moving endpoints of the one or more curves in the respective additional frame based on an average movement of feature points located in a subregion of the respective additional frame that includes a corresponding endpoint; and fitting the one or more curves to the new or changed boundary of the object in the respective additional frame based on the confidence value and the moved endpoints.

14. Computer-readable storage memory as recited in claim 13, wherein at least some of the additional frames are previous to the first frame in the video data.

15. Computer-readable storage memory as recited in claim 13, wherein the one or more curves are automatically propagated onto the additional frames of the video data by at least detecting feature points inside a mask that is enclosed by the one or more curves on the first frame.

16. Computer-readable storage memory as recited in claim 13, wherein the operations further comprise calculating movement of each control point between two adjacent frames relative to one or more motion vectors associated with feature points that are within an area centered at the control point.

17. Computer-readable storage memory as recited in claim 13, wherein the one or more curves are fit to the new or changed boundary of the object in each additional frame using a weighted Bezier curve fitting that is weighted based on the confidence value.

18. Computer-readable storage memory as recited in claim 13, wherein the operations further comprise dividing a segmentation boundary in each of the additional frames into a plurality of segments.

19. Computer-readable storage memory as recited in claim 13, wherein the endpoints are moved by snapping the endpoints to a segmentation boundary of the object in each additional frame.

20. A computer-implemented method as recited in claim 1, wherein the confidence map includes a plurality of areas that each represent a respective confidence value for a respective subregion, the respective confidence value representing an average level of confidence for the respective subregion.

* * * * *